Jan. 25, 1966 R. W. SPIEGEL 3,230,921
SPEED REDUCTION INDICATOR
Filed Jan. 16, 1964
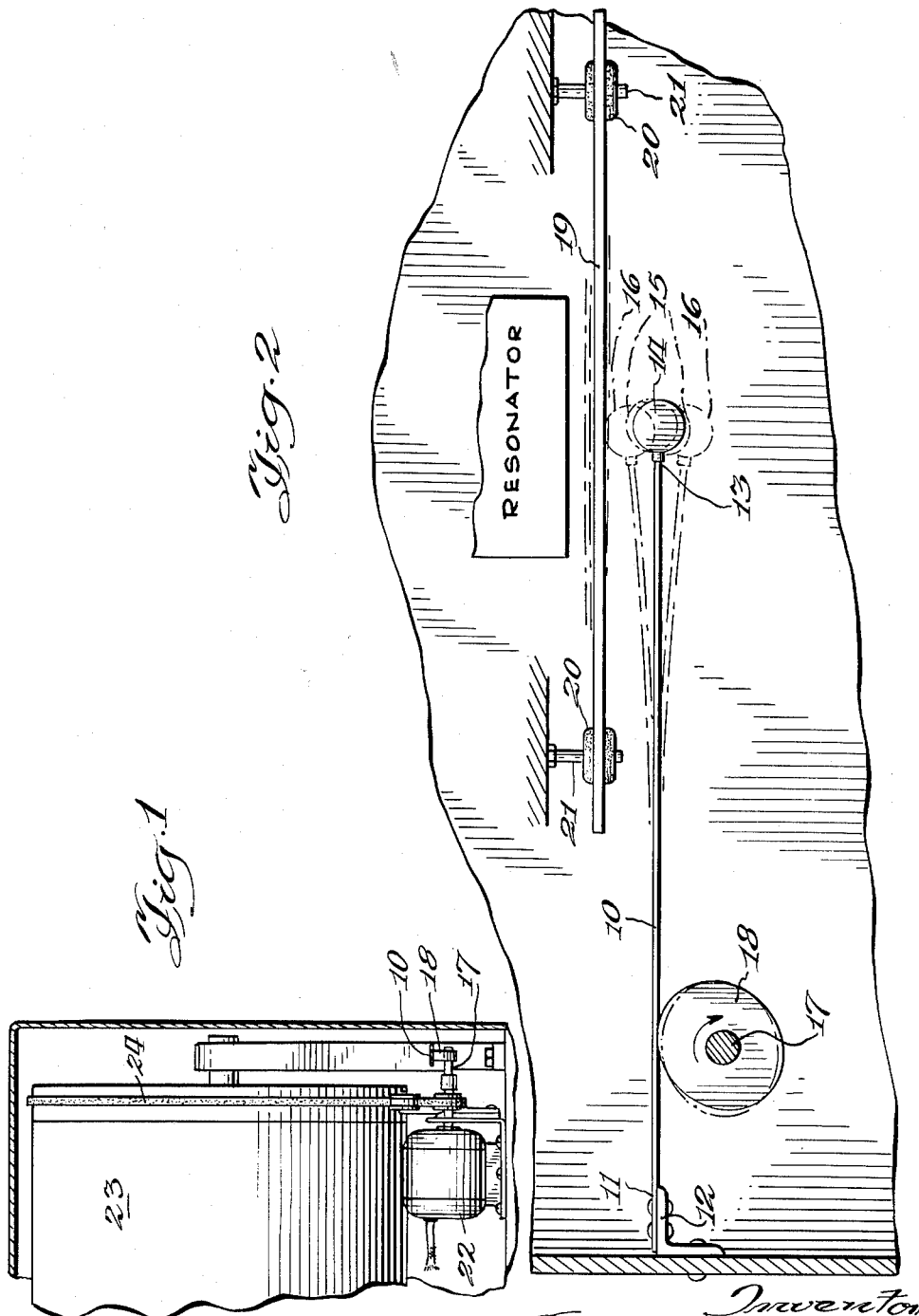
Inventor
Raymond W. Spiegel
By Hofgren, Wegner, Allen, Stellman & McCord
Attorneys

United States Patent Office 3,230,921
Patented Jan. 25, 1966

3,230,921
SPEED REDUCTION INDICATOR
Raymond W. Spiegel, Stevensville, Mich., assignor to Whirlpool Corporation, a corporation of Delaware
Filed Jan. 16, 1964, Ser. No. 338,248
3 Claims. (Cl. 116—67)

This invention relates to a laundry dryer having an indicator for indicating deceleration of the rotatable fabric containing drum.

Clothes dryers customarily have a rotatable drum which is rotated from a standing position to an operating speed during the drying cycle and then is decelerated from the operating speed back to the stationary condition. One of the features of this invention is to provide an improved speed reduction indicator for such a dryer.

Other features and advantages of the invention will be apparent from the following description of one embodiment as shown in the accompanying drawings. Of the drawings:

FIGURE 1 is a fragmentary elevational view partially in section showing a laundry dryer including the speed reduction indicator.

FIGURE 2 is an elevational view partially in section and partially diagrammatic of the speed reduction indicator of FIGURE 1.

The indicator of this invention utilizes a vibratory member 10 here shown in FIGURE 2 as a spring wire having one end 11 fixed as by attaching to a rigid bracket 12 and the other end 13 free and carrying a metal weight 14.

The spring wire 10 has a resonant frequency like all vibratory members at which the spring wire responds with maximum amplitude. The frequency of vibration at which this maximum amplitude is achieved is known as the natural frequency.

This characteristic of the spring wire 10 is utilized in order to show reduction in speed from a normal operating speed. When the spring wire 10 is vibrating at other than its natural frequency the range of movement of the weight 14 is relatively small as indicated by the broken lines 15. However, when the frequency of vibration of the member 10 approaches the natural frequency, the amplitude of movement of the weight 14 is considerably greater as indicated by the broken lines 16. This invention provides means for utilizing this principle to activate or energize a signal device to signal that there is a change in speed of the driven device.

In the illustrated embodiment the invention is used to measure deceleration of a laundry dryer. During the drying cycle a shaft 17 on the dryer is rotated at a normal operating speed such as 1725 r.p.m. This shaft rotates a single lobe cam 18 which bears against the spring wire 10 to impart a forced frequency of 1725 cycles per minute to the wire at normal operating speed. In this embodiment the natural frequency of the wire 10, at which maximum amplitude of movement in the spring wire occurs, is less than the frequency produced at this normal operating speed. As explained above, this means that the maximum extent of movement of the weighted end 14, as indicated at 15, is relatively small.

At a point beyond the amplitude of movement indicated at 15 there is provided a signal device, here shown as a striker plate 19, mounted on resilient grommets 20 carried by posts 21. The plate 19 is such that it will give off an audible signal when struck.

With this arrangement when the shaft 17 is rotating at normal operating speed the weight 14 will not contact the plate 19. However, when the speed of rotation of the shaft 17 is changed so as to impart a forced frequency which is equivalent to or near the natural frequency of vibration of the spring wire 10 then the spring wire tends to vibrate with maximum amplitude after overcoming the effect of inertia as hereinafter described. This causes the weight 14 to strike rapidly the plate 19 as indicated by the broken line 16 to give off an audible signal. This signal indicates the end of the dryer cycle.

As mentioned earlier, in this specific embodiment the normal speed of rotation of the shaft 17 is about 1725 r.p.m. The spring wire 10 is of steel and is about 6 inches long and 0.075 inch diameter. The center of rotation of the shaft 17 is about 1½ inches from the fixed end 11 of the spring wire 10. Because the cam 18 is a single lobe cam the wire 10 will be vibrated at about 1725 cycles per minute. The natural frequency of the spring wire 10 is about 616 cycles per minute. This means that as long as the shaft 17 is operating at normal speed and the spring wire 10 is vibrated at 1725 cycles per minute the weight 14 will not contact the signal plate 19. However, at the end of the drying cycle when the speed of the shaft 17 drops, the weight 14 will be oscillated its maximum extent at about a speed of 616 r.p.m., in the shaft 17 to strike violently the plate 19 and give off an audible signal.

In the illustrated embodiment the shaft 17 coincides with the shaft of the motor 22 used in rotating the drum 23 of the dryer by means of the usual drive belt 24.

The spring wire 10 having mass of course has an inertia or damping effect. This inertia or damping effect is increased by provision of the weight 14 on the free end of the wire. In order to overcome this inertia or damping effect it is necessary to allow an adequate time interval at which the forced frequency is at or near the natural frequency of spring wire 10. The rate of acceleration of motor 22 in bringing drum 23 up to operating speed is such that the inertia or damping effect is not overcome. In other words, the body of the spring 10 will have its vibrating frequency increased at such a rate that the spring will vibrate without the weight 14 being moved sufficiently to strike the plate 19 when drum 23 is accelerated.

However, when decelerating the drum 23 back to its stationary position the rate of deceleration is slower than the rate of acceleration and is such that the inertia effect is overcome and the weight 14 is vibrated through a sufficient distance to strike the plate 19 and give an audible signal.

With an embodiment as described above a representative rate of acceleration is 480 rev./sec./sec. and of deceleration is 72 rev./sec./sec. These values, taken with the other representative values disclosed, provide a device which signals only the termination of a laundry dryer cycle and which is silent upon beginning a cycle of operation. Other values which give similar desired results may of course be used for similar applications, and these are well understood by those skilled in the art.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A laundry dryer, comprising: a rotatable drum adapted to contain fabric; rotating means for rotating said drum at accelerating speed from a standing position to an operating speed; means for returning said drum to said standing poistion at a decelerating speed that is at a rate less than said accelerating speed; a vibratory member having a natural frequency at which vibrations of maximum amplitude occur; operating means adjacent said vibratory member operatively associated with said means for rotating said drum for vibrating said member during said drum acceleration at increasing frequencies variable with said acceleration, and during said drum deceleration at decreasing frequencies variable with said deceleration; and a signal device positioned adjacent said vibratory member activated by said vibratory member at a predetermined amplitude less than said maximum amplitude, said accelerating speed being at such a rate that the inertia of said member prevents said member reaching said predetermined amplitude on said acceleration and said decelerating speed being at a rate that said predetermined amplitude is reached during said deceleration to energize said signal device.

2. The laundry dryer of claim 1 wherein said vibratory member comprises a spring having one end fixed and a signal device actuating means mounted on said spring at a distance from said fixed end.

3. The dryer of claim 2 wherein said signal device actuating means comprises a weight.

References Cited by the Examiner
UNITED STATES PATENTS

| | | | |
|---|---|---|---|
| 817,555 | 3/1906 | Kempf | 73—506 |
| 2,472,371 | 6/1949 | Fish | 116—169 |
| 2,972,139 | 2/1961 | Knutson | 340—70 |
| 3,127,867 | 4/1964 | Bochan | 116—67 |

LOUIS J. CAPOZI, *Primary Examiner.*